F. HURRELBRINK.
ENSILAGE PACKER.
APPLICATION FILED MAR. 22, 1917.
1,255,752.
Patented Feb. 5, 1918.
2 SHEETS—SHEET 1.
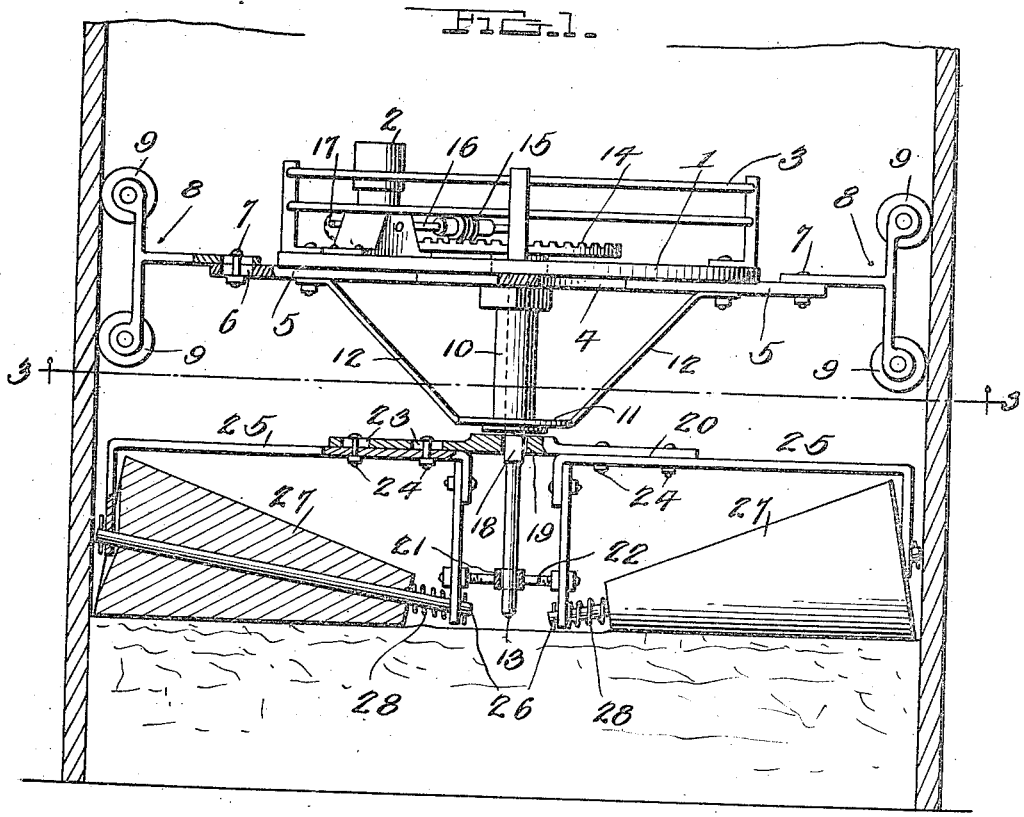
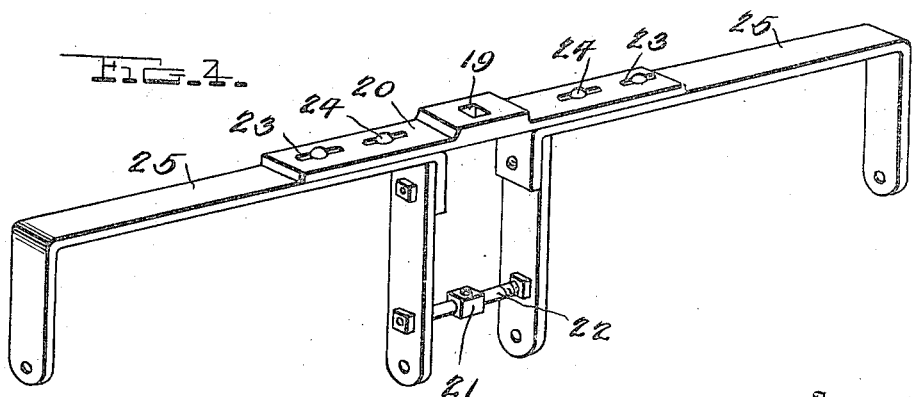

F. HURRELBRINK.
ENSILAGE PACKER.
APPLICATION FILED MAR. 22, 1917.
1,255,752.
Patented Feb. 5, 1918.
2 SHEETS—SHEET 2.
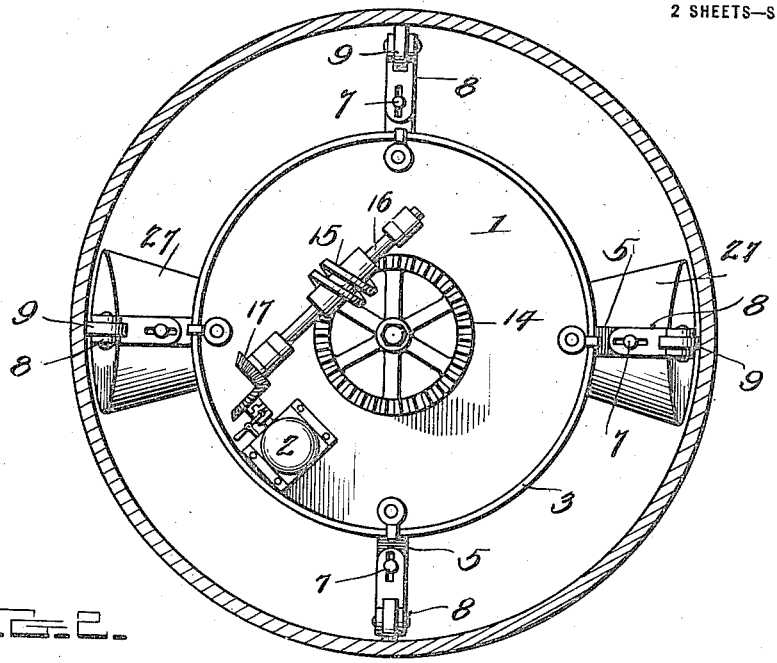
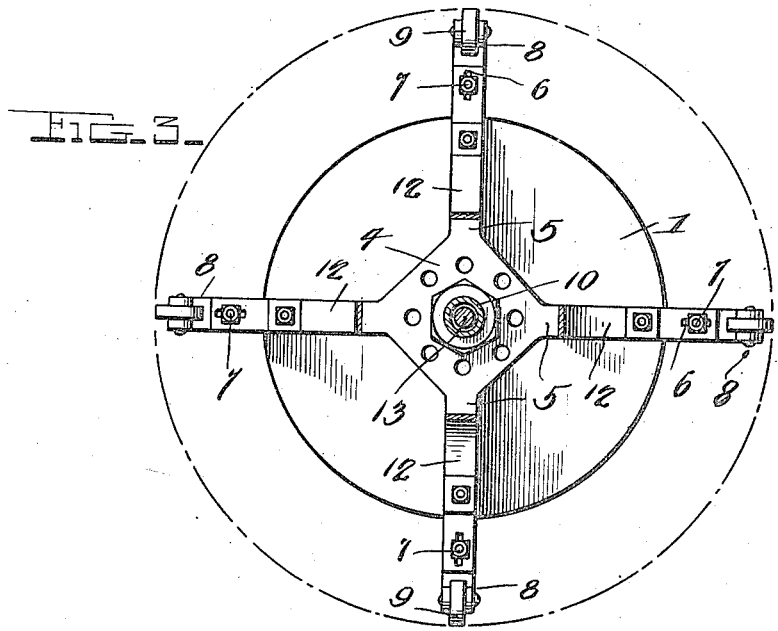

UNITED STATES PATENT OFFICE.

FRANK HURRELBRINK, OF STONINGTON, ILLINOIS.

ENSILAGE-PACKER.

1,255,752.

Specification of Letters Patent.

Patented Feb. 5, 1918.

Application filed March 22, 1917. Serial No. 156,692.

*To all whom it may concern:*

Be it known that I, FRANK HURRELBRINK, a citizen of the United States, residing at Stonington, in the county of Christian and State of Illinois, have invented certain new and useful Improvements in Ensilage-Packers; and I do declare the following to be a full, clear, and exact description of the invention, such as will enable others skilled in the art to which it appertains to make and use the same.

My invention has for its object to provide a comparatively simple and inexpensive, yet a highly efficient power driven machine for packing ensilage in silos and with this general object in view the same resides in the novel features of construction and unique combinations of parts to be hereinafter fully described and claimed, the descriptive matter being supplemented by the accompanying drawings which constitute a part of this specification and in which:

Figure 1 is a side elevation partly in section showing the improved machine within the silo;

Fig. 2 is a horizontal section of the silo illustrating a top plan view of the machine;

Fig. 3 is a horizontal section on the plane of the line 3—3 of Fig. 1 looking upwardly;

Fig. 4 is a perspective view of the rotating frame which carries the packing rollers.

In the drawings above briefly described, the numeral 1 has reference to a preferably circular platform upon which a gasolene engine or other prime mover 2 is mounted for driving the machine. The operator will also stand upon the platform 1 and to obviate any possibility of accident, the latter will in most cases be provided with a railing 3.

The platform 1 rests on and is secured to a spider 4 whose arms 5 project beyond the edge of said platform and are provided with longitudinal slots 6 through which bolts 7 pass for adjustably securing a plurality of shoes 8 to said arms, said shoes being adapted for contact with the wall of the silo to brace the platform against tilting and to prevent rotation thereof. The shoes in question may be of any suitable construction but they are preferably of T-shape as shown and are equipped with rollers 9 for contact with the silo wall.

A tubular bearing 10 depends rigidly from the center of the spider 4 and is provided at its lower end with an outstanding collar 11 from which a plurality of braces 12 incline upwardly and outwardly, the upper ends of said braces being secured to the arms 5. A vertical shaft 13 is rotatably mounted in the bearing 10 and projects below the same a suitable distance, the upper end of said shaft being operatively connected by any preferred driving mechanism with the prime mover 2. For illustrative purposes, however, a worm gear 14 is shown on the upper end of the shaft 13, said gear being driven by a worm 15 on a shaft 16 which is rotated by bevel gears or the like 17 from the engine or motor employed. By using a worm drive, the prime mover 2 need not be of a high horse power and this drive is therefore preferable. It is to be understood, however, that other means could well be employed for driving the shaft 10 and that an electric motor could be used in place of the gasolene engine illustrated.

Immediately below the bearing 10, the shaft 13 is provided with a squared portion 18 for sliding reception in a similarly shaped opening 19 at the center of a horizontal cross arm 20, the lower extremity of the shaft being slidably received in a bearing 21 at the center of a second and shorter cross arm 22. The arm 20 is provided near its ends with longitudinal slots 23 through which bolts 24 pass to adjustably secure a pair of arched frames 25 to said arm, the opposed ends of the arm 22 being detachably connected in any preferred manner with the inner arms of said frames as shown. Upwardly and outwardly inclining shafts or axles 26 extend between the lower ends of the arms of the two frames 25 and cone-shaped packing rollers 27 are rotatably mounted on said axles with their smaller ends disposed inwardly, coiled springs 28 being by preference interposed between the inner arms of the frames and the inner ends of said rollers to hold the latter outwardly to the maximum to insure that they properly pack the ensilage around the wall of the silo. The springs 25 also permit the rollers to yield inwardly in case they come in contact with irregularities in the silo wall and thus the operation of the machine is not interrupted.

The several parts of the machine are readily detached in order that it may be moved into and from the silo through any of the usual doors thereof and during this operation it will be observed that the entire lower frame consisting of the parts 25, 20 and 22 may be moved endwise from the shaft 13 until it is required to again assemble the parts for operation.

After placing the packer in the silo, the shoes 8 are adjusted so that their rollers 9 come in contact with the silo wall and thus the platform is held against tilting and is also prevented from rotating when the prime mover 2 is set in motion, said mover now serving to drive the shaft 13 to rotate the lower frame and propel the rollers 27 over the ensilage to pack the same as it is fed into the silo through the space between the platform and the silo wall.

I claim:

1. An ensilage packer comprising a platform receivable totally in a silo and having means for contact with the wall thereof to hold said platform against rotation, a motor mounted on the platform, a vertical shaft driven from said motor and depending from said platform, a frame secured on said shaft below said platform, and rollers mounted on said frame for packing the ensilage and supporting the entire machine.

2. An ensilage packer comprising a platform support receivable totally in a silo and including radially disposed horizontal bars, arms adjustably secured to the ends of said bars and having shoes for contact with the silo wall to prevent rotation of said support, a platform mounted on said support, a motor mounted on said platform, a tubular bearing depending rigidly from said platform support, a vertical shaft rotatably mounted in said bearing and extending below the same, a horizontal cross bar having its center mounted on said shaft, a pair of arched frames secured adjustably to said bar, and a pair of packing rollers rotatably mounted in said frames.

3. An ensilage packer comprising a vertical shaft having near its lower end a squared portion, means for rotating said shaft, an upper comparatively long cross bar having a rectangular opening receiving said squared portion of the shaft, said opening being located centrally between the ends of said cross bar, a lower and comparatively short cross bar having at its center an opening through which the lower end of the shaft projects, a pair of arched frames each having an opening in one of its arms, the ends of said lower cross bar extending through said openings, nuts threaded on said lower cross bar and contacting with opposite sides of said arms, the ends of the upper cross bar being disposed in contact with the crown bars of said arched frames and having longitudinal slots, and bolts passing through said slots and crown bars for securing the latter adjustably to said upper cross bar.

4. An ensilage packer comprising a plurality of packing rollers, means for propelling said rollers over the ensilage, and spring means for normally forcing said rollers outwardly in close relation with the silo wall and for permitting them to yield inwardly in case irregularities in said wall are encountered.

In testimony whereof I have hereunto set my hand in the presence of two subscribing witnesses.

FRANK HURRELBRINK.

Witnesses:
RAY E. BANDES,
W. E. TURNER.